(12) United States Patent
Zaccagnino et al.

(10) Patent No.: US 8,447,642 B2
(45) Date of Patent: May 21, 2013

(54) LOCAL CONTENT MANAGEMENT AND DISTRIBUTION SYSTEM

(75) Inventors: Jon Scott Zaccagnino, Flemington, NJ (US); Richard Victor Morrison, Jr., Philadelphia, PA (US)

(73) Assignee: Eggzack, Inc., Bethlehem, PA (US)

( * ) Notice: Subject to any disclaimer, the term of this patent is extended or adjusted under 35 U.S.C. 154(b) by 616 days.

(21) Appl. No.: 12/386,313

(22) Filed: Apr. 16, 2009

(65) Prior Publication Data

US 2009/0265219 A1    Oct. 22, 2009

Related U.S. Application Data

(60) Provisional application No. 61/045,656, filed on Apr. 17, 2008.

(51) Int. Cl.
G06Q 10/00    (2012.01)
G06Q 30/00    (2012.01)

(52) U.S. Cl.
USPC ........................................... 705/7.29

(58) Field of Classification Search
USPC ........................................... 705/7.29
See application file for complete search history.

(56) References Cited

U.S. PATENT DOCUMENTS

| | | |
|---|---|---|
| 6,356,903 B1 | 3/2002 | Baxter |
| 6,684,239 B1 | 1/2004 | Flepp |
| 6,742,028 B1 | 5/2004 | Wang |
| 6,889,222 B1 | 5/2005 | Zhao |
| 7,028,034 B2 | 4/2006 | Wesinger, Jr. |
| 7,032,030 B1 | 4/2006 | Codignotto |
| 7,039,594 B1 | 5/2006 | Gersting |
| 7,181,468 B2 | 2/2007 | Spring et al. |
| 7,269,591 B2 | 9/2007 | Wesinger, Jr. |
| 7,301,450 B2 | 11/2007 | Carrino |
| 7,401,138 B2 | 7/2008 | Bimson |
| 7,409,634 B2 | 8/2008 | Davis |
| 7,415,484 B1 | 8/2008 | Tulkoff |
| 7,426,687 B1 | 9/2008 | Schultz |
| 7,447,793 B2 | 11/2008 | Morioka |
| 7,472,427 B2 | 12/2008 | Shimojima |
| 7,493,287 B1 | 2/2009 | Sequeira |
| 7,505,913 B2 | 3/2009 | Tobin |
| 7,512,607 B2 | 3/2009 | Nagano |
| 2009/0030774 A1* | 1/2009 | Rothschild et al. ............. 705/10 |

* cited by examiner

*Primary Examiner* — Seye Iwarere
(74) *Attorney, Agent, or Firm* — Norris McLaughlin & Marcus, P.A.

(57) ABSTRACT

A method and system for the publishing, management and distribution of local content via a plurality of Internet media types. The method and system provides for single entry of local content and automated mass distribution via the Internet. A key component of the method and system is the categorizing and organizing of local content at the point of publishing by the system and/or author of the local content which allows for delivery and/or placement of the local content to a more relevant reader across the plurality of Internet media types.

14 Claims, 4 Drawing Sheets

Figure 1 – Consumer Demographic Data Entry & Management
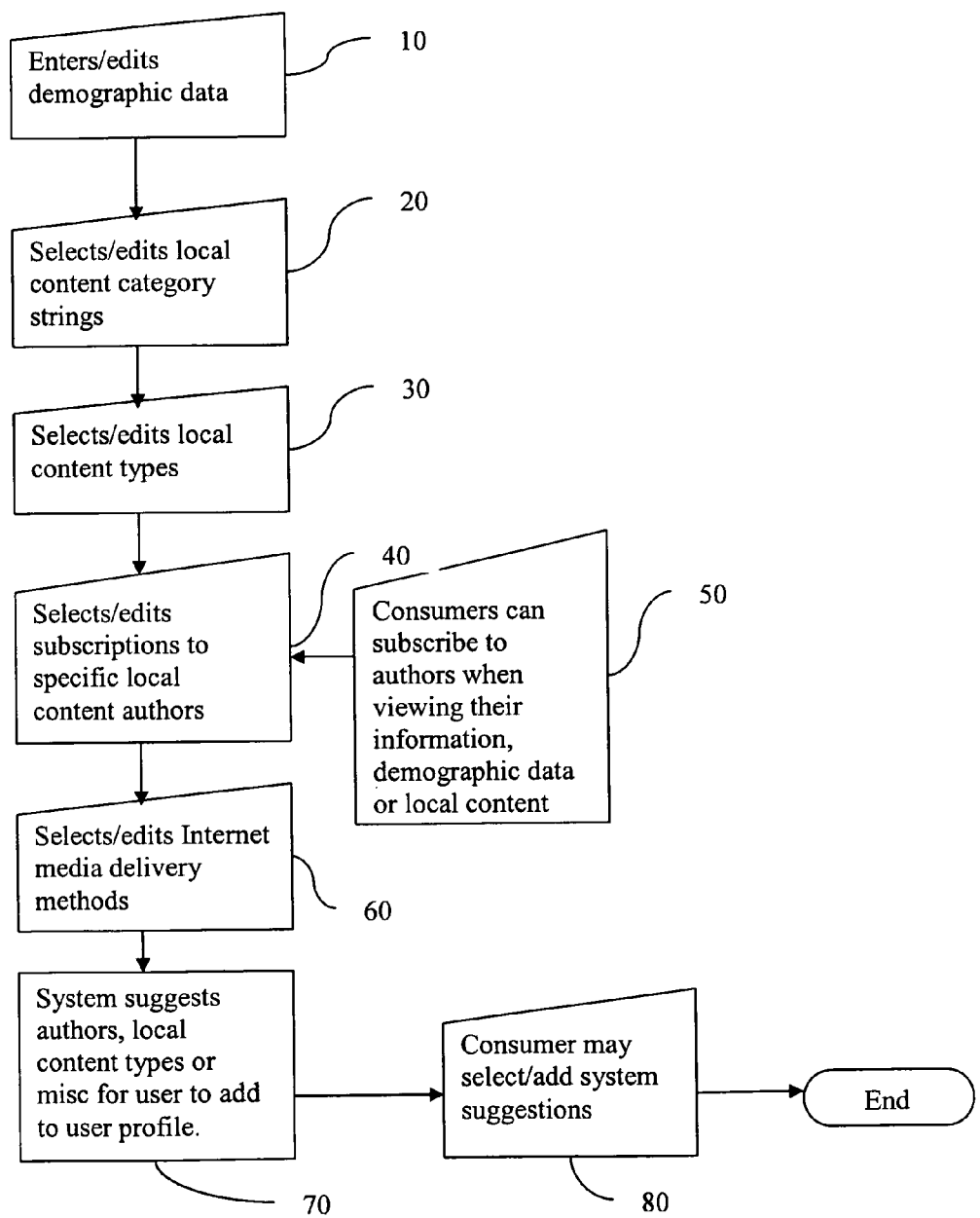

Figure 2 – Local Content Author Demographic Data Entry & Management
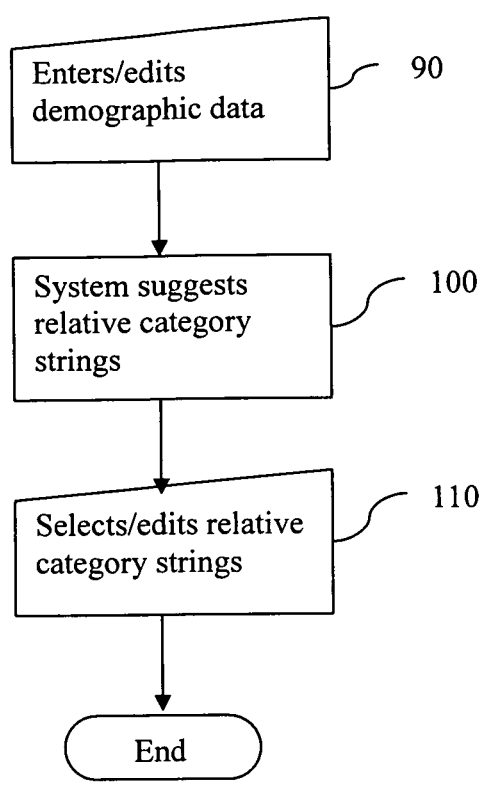

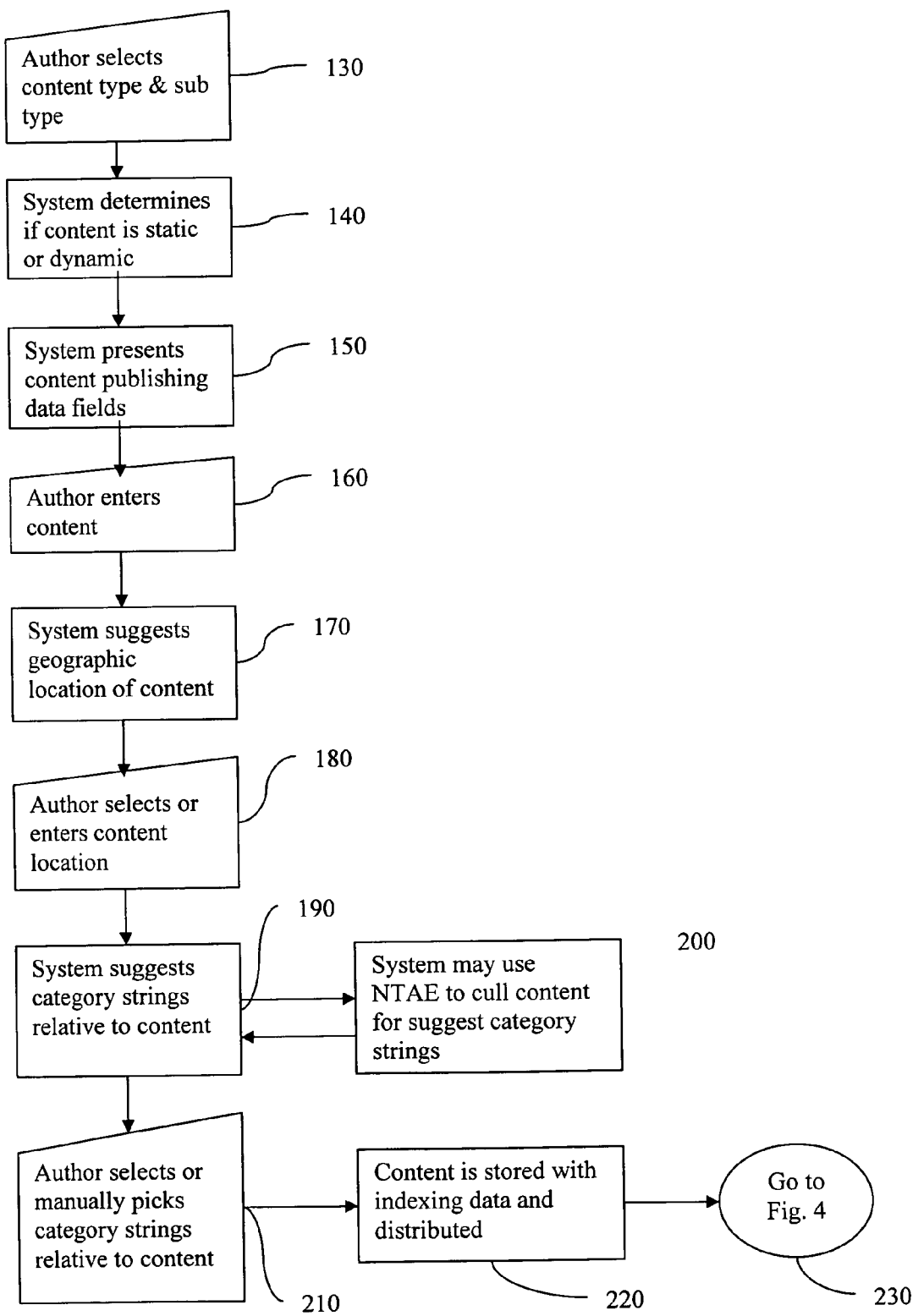
Figure 3 – Local Content Publishing & Management

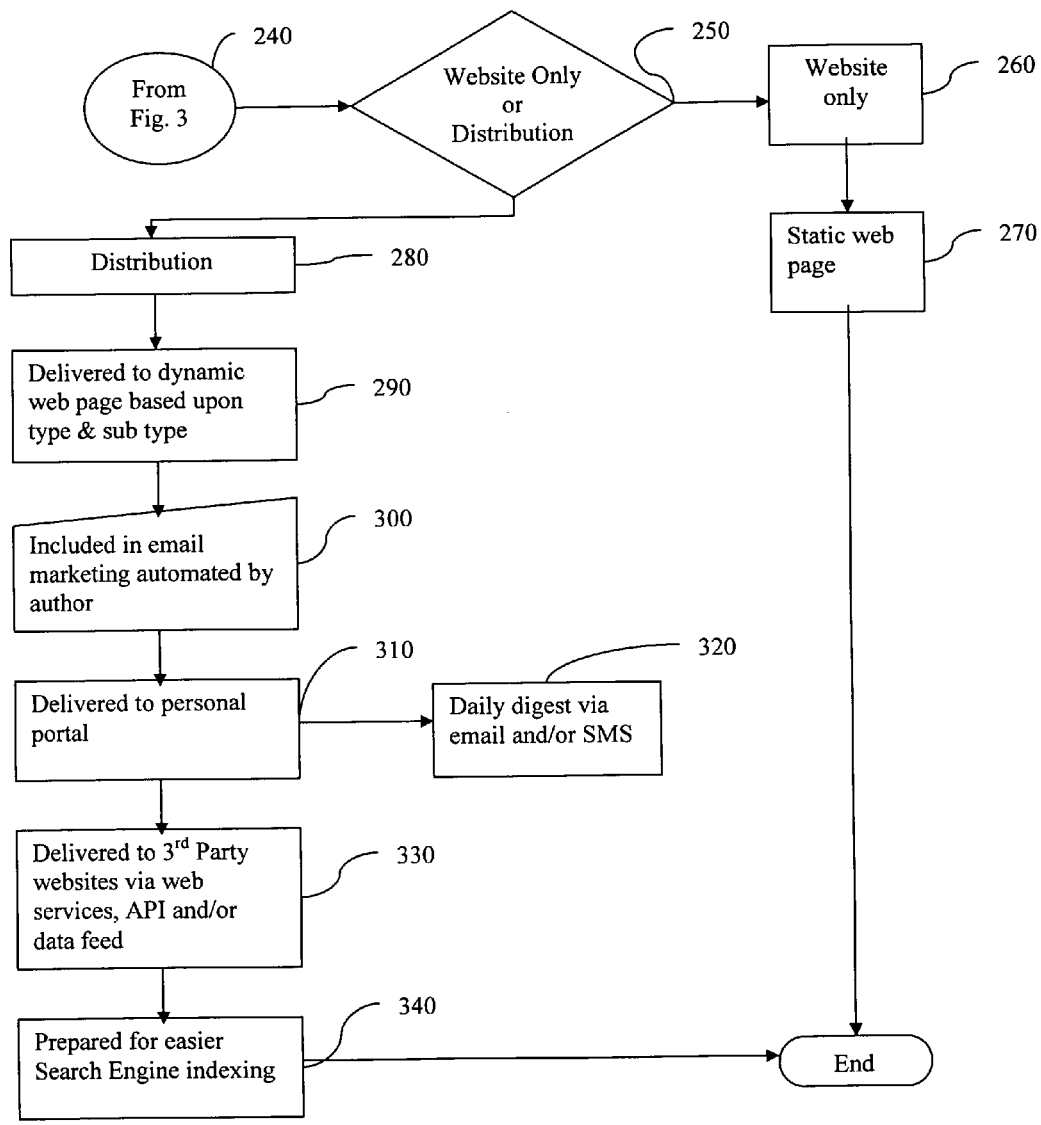
Figure 4 - Automated Local Content Distribution

LOCAL CONTENT MANAGEMENT AND DISTRIBUTION SYSTEM

CROSS REFERENCE TO RELATED APPLICATION

This application claims the benefit of U.S. Patent Application No. 61/045,656, filed Apr. 17, 2008, which is incorporated herein by reference in its entirety.

FIELD OF THE INVENTION

The present invention relates in general to Internet-based publishing, management and distribution of local content and in particular to its automated delivery via a plurality of Internet media types. The present invention provides the methods and systems for single entry point publishing, management and distribution of local content over various media types on the Internet.

BACKGROUND OF THE INVENTION

Despite the fact that the Internet and World Wide Web have grown in size and popularity it is still too difficult to find local content. Local content represents the majority of the content people use regularly.

There are several challenges that are contributing to this problem:

The vast majority of local content is not available online because the publishing, management and distribution of local content to the plurality of Internet media types is too time and resource consuming.

What is available online is hard to find because it is not local sensitive thus reducing the value of publishing and distributing local content.

Local content on the Internet is not standardized or organized to facilitate the exchange of content amongst all of the local stakeholders who use various terms and descriptions to describe the same thing.

Individuals are having a difficult time managing the deluge of content that they are subjected to daily on the Internet. In addition, they have very little control over of the relevancy of the content delivered via the Internet.

Information authors/owners are having difficulty, due to cost and resource challenges, in maintaining their local content on the Internet which is a major contributor to the lack of local content available.

Information authors/owners are having difficulty, due to technical and time challenges in delivering their local content to those that seek it via the various media types available on the Internet. This is mostly due to the fact that the content is not portable or easily exchanged between media types such as email, websites and web portals without technical expertise.

SUMMARY OF THE INVENTION

Consumers/Readers

The present invention was created to provide consumers tight control over their content intake via the Internet. To ensure that consumers get only the relevant local content they desire, each consumers is able to define the content category strings, types and/or specific authors/owners of the content they want.

Category strings are defined as an up to three (3) level categorization system consisting of a category, and possibly; its subcategories; and its subcategories, tertiary categories. Within each local content category string consumers are able to further refine their selection to obtain more precise local content delivery. In addition to consumers defined data, the present invention automatically assigns/incorporates additional filtering, and content selection processes based upon a consumer's demographics, historical use, projected use and geographical data.

Consumers can also select types of content that are more generic, yet still filtered and sorted according to their specific needs.

Consumers can also choose to subscribe to specific authors/owners/providers of local content. Once a consumers has subscribed to a specific author/owner/provider, all local content that they provide will be automatically delivered to the consumers and can be further filtered by their consumers-defined preferences, or not. Consumers can subscribe and unsubscribe at will.

The majority of consumers defined local content is viewed via a consumer's personal portal/dashboard, yet at any time can be viewed using a location and category-based interface that does take into consideration their consumers-defined preferences. At any time, a consumers may change their preference settings. In addition to the World Wide Web delivery interfaces, other Internet and World Wide Web delivery media/mechanisms/systems will be used, such as: e-mail, SMS, printable daily content manifests, mobile e-mail, mobile web, etc.

Publishing and Management of Local Content

At the heart of the present invention, is the ability to control the local content at the point of entry. The local content author/owner/provider provides demographic, geographic and local-based content to facilitate the standardizing and organizing of all their content which facilitates the accurate delivery to consumers. In addition to author/owner/provider provided data, the present invention assigns/incorporates additional filtering, standardization and organization algorithms, based upon a local content author/owner/provider's historical use, projected use and accepted industry specific practices.

The author/owner/provider's local content is uploaded via the World Wide Web either directly through a web interface, third party content management interface and/or programmable data exchange interface.

The entry point of the local content is also key in the standardizing and organizing of local content. The entry point provides key data about the source, type and category of the local content based upon predetermined descriptive data that is assigned to the entry point.

The local content is further standardized and organized using a patent pending technology called "Natural Targeted Advertising Engine." U.S. Patent Application No. 60/978, 616, filed Oct. 9, 2007, The NTAE facilitates the categorization and location assignment of the local content. The present invention is not based on or dependant of the patent pending NTAE.

Distributing Local Content

The final task of the present invention is to accurately deliver the local content to the consumers who want it in a manner that is convenient to them and self determined. The delivery method consists of five (5) unique distribution paths, yet is not limited to these only:

Consumers are provided an interface via the World Wide Web in the form of a personal portal/dashboard to receive the content that they have defined as relevant. The personal portal/dashboard is organized by local content master categories. Within each category, consumers may further define the content they desire. Additional consumers interface facilitation tools are provided to make sorting, displaying and overall look and feel, personally beneficial and relevant to each specific consumers.

Local content is also delivered to consumers, via daily digest on several other Internet delivery methods such as e-mail, SMS, mobile e-mail, mobile web, etc., and via daily manifests. Daily digests are an encapsulation and brief description of all the newest daily content that is on a consumer's personal portal/dashboard. A Daily manifest is a printable format that allows the consumers to read the local content that is available via their personal portal/dashboard in its entirety, on paper, offline or other portable digital reading devices.

Local content author/owner/provider can have their own web site automatically updated and/or fully deployed with the local content that they provide the present invention via a programmable data exchange interface. They can either have, parts of their local content updated on their website or have their entire website's content, navigation, format, etc. published, deployed, managed, and/or updated by the present invention.

Local content in the present invention is also made readily available for search engine indexing. The present invention adds additional content that is specifically designed to provide better indexing for search engines and their automated indexing process. The content that is added to the original local content varies based upon the multitude of search engines and their ever changing search algorithms.

The present invention will also integrate via programmable data exchange interface to licensed third-party providers of content to further promote and distribute local content.

CONCLUSION

The present invention is designed to facilitate the gathering, publishing, managing, promoting and distributing of local content. It is further designed, to provide one place for a provider, author and/or owner of local content to properly control and benefit from it across the plurality of Internet media types.

BRIEF DESCRIPTION OF THE DRAWINGS

The invention will become more readily apparent from the following description of preferred embodiments thereof shown, by way of example only, in the accompanying drawings wherein:

FIG. 1 is a flowchart showing how a consumers (consumer of content), enters their demographic information, selects content authors and how this information is stored on the Local Content Management & Distribution System according to the invention;

FIG. 2 is a flowchart showing how a local content author enters their demographics, selects relative category strings and how this information is stored on the Local Content Management & Distribution System according to the invention; and FIG. 3 is a flowchart showing how a local content author publishes and manages local content, and how the local content is categorized, organized and stored on the Local Content Management & Distribution System according to the invention; and FIG. 4 is an extension of FIG. 3 and is a flowchart showing how the local content is distributed across the plurality of Internet media types by the Local Content Management & Distribution System according to the invention.

DETAILED DESCRIPTION OF THE INVENTION

As represented by reference numeral 10 in FIG. 1 a consumer, i.e., a consumer of local content, enters into the system according to the invention, their demographic information. Inputted content preferably includes information concerning their home and work location, age, gender and other standard demographical information. At step 20 the consumer selects or edits existing/suggested local content category strings they feel are relative to the content they desire now and in the future. At step 30 the consumer selects or edits existing local content types and their corresponding sub-types that they feel are relative to the content types they desire now and in the future. i.e. "events-kids" which refers to events specifically targeted towards kids. At step 40 the consumer is presented with the option of searching for specific local content authors that they would like to receive local content from. The system provides several means to select local content authors such as, key word, content type and author name. At step 50 in a separate process within the system, the consumer can add a specific author as they are reading their local content by clicking on a button or hyperlink that allows them to automatically update the consumer's demographics data accordingly. At step 60 the consumer selects the Internet media methods they wish to have their local content delivered to from the system i.e. email, SMS, Personal portal web page, etc. At step 70 the system suggests authors, content types and/or category strings that are relative to the consumer's previous data entry based upon a system algorithm. At step 80 consumers choose to select or not the suggestions of the system and then submits the demographic data to be stored on the system. The consumers demographics profile entry or edit process is completed.

Referring to FIG. 2, at step 90 the local content author (LCA) enters demographic data. Such data typically includes their location, products, services and general information. At step 100, the system suggests relative category strings based upon the demographic data entered. The system makes suggestions typically based upon keywords and phrases that are associated with the category strings as related to the demographic data as entered by the LCA. At step 110, the LCA selects or edits the system's suggestions for category strings to be associated with their demographics profile. The local content author demographics profile entry or edit process is completed.

Referring to FIG. 3, at step 130 the LCA selects the content type and may also select a related sub type. At step 140 the system, based upon the content type, determines if the content is a static web page or dynamic content. At step 150 the system presents the appropriate data fields relative to the content type. For example, if the content type was a news article, the data fields for news content would be presented for input by the LCA. At step 160 the LCA enters the appropriate local content. At step 170 the system suggests the location of the local content and provides the option for the LCA to either select the suggestion or enter a new location. The location is generally zip code based and either town, county, region, state or country specific in its scope (radius) of location. At step 180 the LCA either accepts the system suggested location or enters a new one, and then selects the scope (radius) of the location i.e. town, county, region, state or country. At step 190 the system suggests category strings relative to the content and/or LCA's demographic data. At step 200 the system may incorporate the Natural Targeted Advertising Engine (U.S. Patent Application No. 60/978,616, filed Oct. 9, 2007) to suggest relative categories, yet is not dependent upon this invention to do so. At step 210 the LCA selects or manually determines the category strings relative to the local content. At step 220 the local content along with the associated category strings and indexing data for the local content are stored. At step 230 the process is continued on FIG. 4.

Referring to FIG. 4, at step 240 the system, based upon the content type takes two separate paths. At step 250 the system will proceed to step 260 if the content is intended only for publishing on the LCA's website. At step 270 the local content is published on the LCA's website in the form of a static web page along with indexing data that is useful for search engine optimization. The process for publishing local content in the form of a static web page is completed Returning to FIG. 4 at step 250 for the second option, when the system is presented a content type that is dynamic and intended for distribution it proceeds to step 280 to start the automated distribution process. At step 290 the local content is published on the LCA's website in the form of a dynamic web page with the data being delivered from a data base system. At step 300 the system presents the local content to be included in an email. The content may be selected by the LCA at anytime for inclusion into the email. At step 310 the local content is delivered to a consumer's personal portal generally when the following criteria has been met; a) the consumers has preselected the content's type, sub type and/or location scope, b) the consumers has subscribed to the LCA for delivery of their local content or c) it's criteria matches that of other various content filters that the consumers has determined desirable to receive. At step 320 the consumers may have selected to have been notified via email or SMS for example that new local content is available for review.

At step 330 a $3^{rd}$ party website will be delivered local content that may be included on their website(s) via web services, data feed or API (application program interface) generally when the following criteria has been met; a) the $3^{rd}$ party website has preselected the content's type, sub type and/or location scope, b) the $3^{rd}$ party website has subscribed to the LCA for delivery of their local content or c) it's criteria matches that of other various content filters that the $3^{rd}$ party website has determined desirable to receive. At step 340 the system indexes the local content and adds specific location, category string and various other meta data to prepare the local content for easier search engine optimization. The process of automated distribution is completed.

Although the invention has been described in detail for the purpose of illustration, it is to be understood that such detail is solely for that purpose and that variations can be made therein by those skilled in the art without departing from the spirit and scope of the invention as claimed herein.

What is claimed is:

1. A method for single entry point publishing, managing, promoting, distributing and delivering local content across a plurality of Internet media types deliverable over the World Wide Web or the Internet, the method comprising:
    providing a local content management and distribution web-based system comprising at least a first web interface device and a second web interface device connected to and in communication with each other via the World Wide Web or the Internet;
    selecting or entering a content type and demographic data for the local content via the first web interface device, wherein the demographic data comprises geographical relevance of the local content and an author of the local content, wherein the local content is uploaded to the web-based system via the first web interface device, wherein the geographical relevance is based on a zip code and a location scope specific to the zip code, wherein the location scope is at least one selected from a town, a county, a region, a state and a country;
    storing the local content in the web-based system; and
    delivering the local content, for automated mass distribution, via a first media delivery type and at least one second media delivery type, wherein the first media deliver type and the at least one second media delivery type are deliverable over the World Wide Web or the Internet, wherein the first media delivery type is a third party website accessible via the second web interface device, wherein the local content is delivered to the third party website when at least one of the following criteria has been met;
    (a) the third party website preselected at least one of the content type of the local content and the location scope of the local content;
    (b) the third party website subscribed to the author of the local content; or
    (c) criteria associated with the local content matched content filters associated with the third party website.

2. The method according to claim 1, further comprising:
    selecting one or more category strings for the local content based on the demographic data.

3. The method according to claim 2, further comprising:
    suggesting one or more keywords and phrases associated with the one or more category strings, for the local content, based on the demographic data.

4. The method according to claim 1, further comprising:
    searching for local content based on a keyword associated with the local content, the content type of the local content, an author name of the local content or demographic data of the local content.

5. The method according to claim 1, further comprising:
    selecting the media delivery types, for delivering the local content, from the plurality of media delivery types.

6. The method according to claim 1, wherein the at least one second media delivery type comprises an e-mail, a mobile e-mail, a SMS, a printable manifest, a website, an Internet media type, a mobile website or a web portal.

7. The method according to claim 1, wherein the at least one second media delivery type comprises
    a personal portal accessible via a World Wide Web interface,
    a daily digest or internet delivery method,
    an automatically updated website,
    search engine indexing, or
    a programmable data exchange interface.

8. The method according to claim 1, further comprising:
    publishing the local content in a form of a static web page or a dynamic web page, based on the content type of the local content, with data delivered from a database system.

9. The method according to claim 1, further comprising:
    publishing the local content, as a static web page, on a website of the author of the local content along with indexing data usable for search engine optimization.

10. The method according to claim 1, further comprising:
    delivering the local content to a consumer via second web interface device or the at least one second media delivery type.

11. The method according to claim 1, wherein the local content is included on the third party website via a web service, a data feed or an application program interface.

12. The method according to claim 1, wherein the first web interface device uploads the local content to the web-based system via a web-based interface, a third party content management interface or a programmable data exchange interface.

13. The method according to claim 1, further comprising:
 notifying consumers that the local content is available for review via e-mail or SMS.

14. The method according to claim 1, further comprising:
 distributing the local content to one or more third-party providers of content via a programmable data exchange interface.

* * * * *